United States Patent Office 3,341,580
Patented Sept. 12, 1967

3,341,580
TETRAHYDROCARBYL PHOSPHONIUM
ACID CARBOXYLATES
Ingenuin Hechenbleikner, Kenwood, Ohio, assignor to Carlisle Chemical Works, Inc., Reading, Ohio, a corporation of Ohio
No Drawing. Filed June 21, 1965, Ser. No. 465,746
19 Claims. (Cl. 260—541)

The present invention relates to novel phosphonium compounds and their method of preparation.

It is an object of the present invention to prepare novel phosphonium salts.

Another object is to prepare phosphonium dicarboxylic acid salts.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by preparing compounds having one of the formulae:

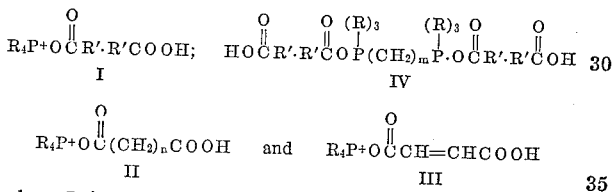

where R is a hydrocarbon group, R' is hydrogen or hydrocarbon, $n$ is 0 or an integer, e.g. an integer from 1–10 and $m$ is an integer, e.g. from 1–10.

The compounds of formula I are prepared by reacting a tetrahydrocarbon phosphonium halide with an ammonium or alkali metal salt of the appropriate carboxylic acid in the presence of the free acid. If the free acid is a liquid it can be used as the solvent for the reaction. If it is not, then there can also be included a solvent for the ammonium or alkali metal salt of the carboxylic acid. Typical solvents include alcohols, e.g. methyl alcohol, ethyl alcohol, propyl alcohol, isopropyl alcohol, butyl alcohol, or amyl alcohol; nitriles, e.g. acetonitrile, propionitrile, butyronitrile, valeronitrile; ethers, e.g. diethyl ether, dipropyl ether, dibutyl ether, diamyl ether; esters, e.g. ethyl acetate, methyl acetate, ethyl propionate, etc. There should be used at least one mole of ammonium or alkali metal salt of the carboxylic acid per mole of the tetrahydrocarbon phosphonyl halide. Preferably, a slight excess of the salt is used. Also there should be employed at least one mole of the free carboxylic acid, although this can be present in a large excess.

In preparing the compounds of formulae II and III, there is employed one mole or a slight excess thereover of the half ammonium or half alkali metal salt of the dicarboxylic acid per mole of phosphonium halide.

In preparing the compounds of formula IV, there are used two moles (or a slight excess thereover) of ammonium or alkali metal carboxylic acid salt and there are also used at least two moles of free monocarboxylic acid per mole of phosphonium halide.

Examples of starting phosphonium halides are tetrabutyl phosphonium chloride, tetrabutyl phosphonium bromide, tetramethyl phosphonium iodide, tetraethyl phosphonium chloride, benzyl trioctyl phosphonium chloride, tetrapropyl phosphonium iodide, tetraisopropyl phosphonium iodide, tetrahexyl phosphonium chloride, tetrabutyl phosphonium iodide, tetraphenyl phosphonium iodide, tetramethyl phosphonium chloride, tetraphenyl phosphonium bromide, tetrabenzyl phosphonium iodide, tetrahexyl phosphonium bromide, methallyl tributyl phosphonium chloride, tetra(3-methylphenyl)phosphonium iodide, tetra(2-naphthyl)phosphonium iodide, allyl trihexyl phosphonium chloride, trimethyl ethyl phosphonium chloride, trimethyl isoamyl phosphonium chloride, tetraoctyl phosphonium chloride, trimethyl phenyl phosphonium iodide, trimethyl benzyl phosphonium bromide, tetra(decyl) phosphonium chloride, tetraoleyl phosphonium chloride, tetraoctadecyl phosphonium chloride, tetraphenyl phosphonium chloride, tetrabenzyl phosphonium chloride, phenyl tributyl phosphonium chloride, tetra p-methylphenyl phosphonium chloride, dibutyl dioctyl phosphonium chloride, tetramethylene bis(tributylphosphonium chloride), methylene bis(tributylphosphonium chloride), decamethylene bis(tributylphosphonium chloride), tetramethylene bis(trioctylphosphonium chloride), trimethylene bis(trimethylphosphonium chloride), hexamethylene bis(trioctadecylphosphonium chloride), tetramethylene bis(trioleylphosphonium chloride), tetramethylene bis(triphenylphosphonium chloride), hexamethylene bis(tribenzylphosphonium chloride), trimethyl 2,4-dimethylphenyl phosphonium chloride, trimethyl 4-ethylphenyl phosphonium iodide, triethyl methyl phosphonium chloride, methylene bis(triethylphosphonium chloride), $Cl(CH_3)_3PCH_2CH_2P(C_2H_5)_3Cl$, triethyl propyl phosphonium chloride, tetramethylene bis(triethylphosphonium bromide), triethyl isoamyl phosphonium chloride, triethyl octyl phosphonium iodide, triethyl hexadecyl phosphonium iodide, triethyl phenyl phosphonium iodide, triethyl p-methylphenyl phosphonium iodide, triethyl benzyl phosphonium chloride, triethyl phenylethyl phosphonium iodide, triallyl methyl phosphonium iodide, tripropyl methyl phosphonium iodide, tripropyl ethyl phosphonium iodide, tripropyl butyl phosphonium iodide, tripropyl phenyl phosphonium iodide, triisopropyl methyl phosphonium iodide, tributyl methyl phosphonium iodide, tributyl ethyl phosphonium iodide, tributyl propyl phosphonium iodide, tributyl phenylethyl phosphonium chloride, trimethallyl methyl phosphonium iodide, triisobutyl methyl phosphonium iodide, triphenyl methyl phosphonium chloride, triphenyl ethyl phosphonium iodide, triphenyl isoamyl phosphonium iodide, methylene bis(triphenyl phosphonium iodide), ethylene bis(triphenyl phosphonium bromide), triphenyl benzyl phosphonium chloride, tribenzyl ethyl phosphonium chloride, tri(p-tolyl) methyl phosphonium iodide, tri(p-tolyl)isopropyl phosphonium iodide, tri(2,5-dimethylphenyl)methyl phosphonium iodide, dimethyl ethyl phenyl phosphonium iodide, dimethyl allyl phenyl phosphonium bromide, dimethyl octyl benzyl phosphonium chloride, dimethyl dodecyl benzyl phosphonium chloride, dimethyl hexadecyl benzyl phosphonium chloride, dimethyl phenyl benzyl phosphonium chloride, dimethyl phenyl phenylethyl phosphonium bromide, diethylmethyl phenyl phosphonium iodide, diethyl methyl o-tolyl phosphonium iodide, diethyl allyl phenyl phosphonium bromide, dipropyl methyl phenyl phosphonium iodide, dibutyl methyl phenyl phosphonium iodide, dibutyl ethyl phenyl phosphonium iodide, diisobutyl methyl phenyl phosphonium iodide, dimethallyl methyl phenyl phosphonium iodide, dimethallyl methyl 4-ethylphenyl phosphonium iodide, diamyl methyl phenyl phosphonium icdide, dihexyl methyl phenyl phosphonium iodide, diheptyl methyl phenyl phosphonium iodide, dioctyl methyl phenyl phosphonium iodide, diphenyl methyl ethyl phosphonium iodide, diphenylmethyl allyl phosphonium iodide, diphenyl ethyl propyl phosphonium iodide, dibenzyl methyl phenyl phosphonium iodide, dibenzyl ethyl phenyl phosphonium iodide, dimethyl diethyl phosphonium chloride, dimethyl diphenyl phosphonium iodide, diethyl diphenyl phosphonium iodide, diethyl dibenzyl phosphonium chloride, diisobutyl diphenyl phosphonium iodide, methyl ethyl isopropyl isobutyl phosphonium iodide, methyl ethyl phenyl benzyl phosphonium iodide, methyl ethyl phenyl 4-methylphenyl phosphonium iodide, methyl ethyl phenyl 2,4,5-trimethylphenyl phosphonium iodide, methyl allyl phenyl 4-methylphenyl phosphonium iodide, ethyl phenyl benzyl 4-methylphenyl phosphonium bromide.

Many of the phosphonium halides employed as starting materials are old. Those which are new can be formed in conventional fashion, for example, by reacting a trihydrocarbyl phosphine with the appropriate hydrocarbyl chloride or bromide or iodide as shown in Kosolapoff "Organo-phosphorus Compounds" pages 78–79.

As the ammonium or alkali metal salts there can be used ammonium acetate, sodium acetate, potassium acetate, ammonium formate, potassium formate, sodium formate, ammonium propionate, sodium propionate, potassium propionate, ammonium butyrate, sodium butyrate, ammonium valerate, potassium valerate, sodium hexanoate, ammonium hexanoate, potassium octoate, sodium octoate, ammonium decanoate, sodium decanoate, ammonium laurate, sodium laurate, potassium palmitate, sodium stearate, potassium stearate, ammonium stearate, potassium oleate, sodium oleate, ammonium oleate, potassium acrylate, ammonium acrylate, sodium acrylate, sodium benzoate, potassium benzoate, ammonium benzoate, sodium cinnamate, ammonium acid oxalate, potassium acid oxalate, sodium acid oxalate, sodium acid malonate, monosodium succinate, monopotassium succinate, monoammonium succinate, monoammonium maleate, monosodium maleate, monopotassium fumarate, monosodium glutarate, monoammonium adipate, monopotassium adipate, monoammonium sebacate, monopotassium sebacate, monosodium sebacate, sodium crotonate, ammonium isobutyrate, sodium methacrylate.

As the normally liquid free acids which can be used both as reactant and solvent, there can be used formic acid, acetic acid, propionic acid, butyric acid, isobutyric acid, acrylic acid, methacrylic acid, valeric acid, isovaleric acid, caproic acid (hexanoic acid), enanthic acid, caprylic acid, pelargonic acid, oleic acid, linoleic acid.

As solid acids which can be used as reactants, usually together with an inert solvent, there can be used capric acid, undecylic acid, lauric acid, palmitic acid, stearic acid, oxalic acid, malonic acid, maleic acid, fumaric acid, succinic acid, glutaric acid, adipic acid, pimelic acid, suberic acid, azelaic acid and sebacic acid. The compounds of Formula I can be called tetrahydrocarbyl phosphonium dicarboxylates. Such compounds according to accepted nomenclature can also be called tetrahydrocarbyl phosphonium hydrogen carboxylates or tetrahydrocarbyl phosphonium acid carboxylates. An example of such a compound is tetrabutyl phosphonium diacetate (also called tetrabutyl phosphonium hydrogen acetate or tetrabutyl phosphonium acetate) which can be prepared according to the equation:

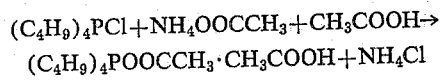

$$(C_4H_9)_4PCl + NH_4OOCCH_3 + CH_3COOH \rightarrow$$
$$(C_4H_9)_4POOCCH_3 \cdot CH_3COOH + NH_4Cl$$

Other examples of compounds within Formula I are tetrabutyl phosphonium dihexanoate, benzyl trioctyl phosphonium diacetate, methallyl tributyl phosphonium diacetate, tetrahexyl phosphonium diacetate, tetramethyl phosphonium diacetate, allyl trihexyl phosphonium diacetate, tetraoctyl phosphonium diacetate, tetra (decyl) phosphonium diacetate, tetraoleyl phosphonium diacetate, tetra octadecyl phosphonium diacetate, tetraphenyl phosphonium diacetate, tetra benzyl phosphonium diacetate, phenyl tributyl phosphonium diacetate, tetra p-methylphenyl phosphonium diacetate, tetra o-methylphenyl phosphonium diacetate, tetra p-octylphenyl phosphonium diacetate, dibutyl dioctyl phosphonium diacetate, tetrabutyl phosphonium diformate, tetrabutyl phosphonium dipropionate, tetraethyl phosphonium dipropionate, tetra hexyl phosphonium dipropionate, tetra hexyl phosphonium dibutyrate, tetramethyl phosphonium diisobutyrate, tetrabutyl phosphonium divalerate, tetraphenyl phosphonium divalerate, tetraamyl phosphonium divalerate, tetrabenzyl phosphonium dihexanoate, tetrabutyl phosphonium dienanthate, tetrabutyl phosphonium dioctanoate, tetrabutyl phosphonium didecanoate, tetrahexyl phosphonium dilaurate, tetrabutyl phosphonium distearate, tetradodecyl phosphonium distearate, tetrabutyl phosphonium dioleate, tetraoctyl phosphonium dioleate, tetrapropyl phosphonium dilinoleate, tetrapropyl phosphonium diacetate, tetrabutyl phosphonium diacrylate, tetrahexyl phosphonium dimethacrylate, tetrabutyl phosphonium dibenzoate, tetrapropyl phosphonium dicinnamate, methyl tributyl phosphonium dipalmitate, diethyl dihexyl phosphonium dilaurate, tetrahexyl phosphonium dicrotonate, tetrapropyl phosphonium diacetate, tetraisopropyl phosphonium diacetate, tetra (3-methylphenyl) phosphonium diacetate, tetra (α-naphthyl) phosphonium diacetate, trimethyl ethyl phosphonium diacetate, trimethyl isoamyl phosphonium diacetate, trimethyl phenyl phosphonium diacetate, trimethyl benzyl phosphonium diacetate, trimethyl 2,4 - dimethylphenyl phosphonium diacetate, trimethyl 4 ethylphenyl phosphonium diacetate, triethyl methyl phosphonium diacetate, triethyl propyl phosphonium diacetate, triethyl isoamyl phosphonium diacetate, triethyl octyl phosphonium diacetate, triethyl hexadecyl phosphonium diacetate, triethyl phenyl phosphonium diacetate, triethyl p-methylphenyl phosphonium diacetate, triethyl benzyl phosphonium diacetate, triethyl phenylethyl phosphonium diacetate, triallyl methyl phosphonium diacetate, tripropyl methyl phosphonium diacetate, tripropyl ethyl phosphonium diacetate, tripropyl butyl phosphonium diacetate, tripropyl phenyl phosphonium diacetate, triisopropyl methyl phosphonium diacetate tributyl methyl phosphonium diacetate, tributyl ethyl phosphonium diacetate, tributyl propyl phosphonium diacetate, tributyl phenylethyl phosphonium diacetate, trimethallyl methyl phosphonium diacetate, triisobutyl methyl phosphonium diacetate, triphenyl methyl phosphonium diacetate, triphenyl ethyl phosphonium diacetate, triphenyl isoamyl phosphonium diacetate, triphenyl benzyl phosphonium diacetate, tribenzyl ethyl phosphonium diacetate, tri (p-tolyl) methyl phosphonium diacetate, tri (p-tolyl) isopropyl phosphonium diacetate, tri (2,5-dimethylphenyl) methyl phosphonium diacetate, dimethyl ethyl phenyl phosphonium diacetate, dimethyl allyl phenyl phosphonium diacetate, dimethyl octyl benzyl phosphonium diacetate, dimethyl dodecyl benzyl phosphonium diacetate, dimethyl hexadecyl benzyl phosphonium diacetate, dimethyl phenyl benzyl phosphonium diacetate, diethyl methyl o-tolyl phosphonium diacetate, diethyl allyl phenyl phosphonium diacetate, dipropyl methyl phenyl phosphonium diacetate, dibutyl methyl phenyl phosphonium diacetate, dibutyl ethyl phenyl phosphonium diacetate, diisobutyl methyl phenyl phosphonium diacetate, dimethallyl methyl phenyl phosphonium diacetate, dimethallyl methyl 4 - ethylphenyl phosphonium diacetate, diamyl methyl phenyl phosphonium diacetate, dihexyl methyl phenyl phosphonium diacetate, diheptyl methyl phenyl phosphonium diacetate, dioctyl methyl phenyl phosphonium diacetate, diphenyl methyl ethyl phosphonium diacetate, diphenyl methyl allyl phosphonium diacetate, diphenyl ethyl propyl phosphonium diacetate, dibenzyl methyl phenyl phosphonium diacetate, dibenzyl ethyl phenyl phosphonium diacetate, dimethyl diethyl phosphonium diacetate, dimethyl diphenyl phosphonium diacetate, diethyl diphenyl phosphonium diacetate, diethyl dibenzyl phosphonium diacetate, diisobutyl diphenyl phosphonium diacetate, methyl ethyl isopropyl isobutyl phosphonium diacetate, methyl ethyl phenyl benzyl phosphonium diacetate, methyl ethyl phenyl 4 - methylphenyl phosphonium diacetate, methyl ethyl phenyl 2,4,5 - trimethylphenyl phosphonium diacetate, methyl allyl phenyl 4-methylphenyl phosphonium diacetate and ethyl phenyl benzyl 4-methylphenyl phosphonium diacetate.

Examples of compounds within Formula II are monotetrabutyl phosphonium oxalate, monotetrabutyl phosphonium malonate, monotetrabutyl phosphonium succinate, monotetrabutyl phosphonium adipate, monotetrabutyl phosphonium pimelate, monotetrabutyl phosphonium sebacate, monotetraphenyl phosphonium succinate, mono(benzyl trioctyl phosphonium) adipate, mono(allyl trihexyl phosphonium)glutarate, monotetraoleyl phosphonium malonate.

Examples of compounds within Formula III are monotetrabutyl phosphonium maleate, monotetrapropyl phosphonium fumarate, monotetraphenyl phosphonium maleate, monotetrabenzyl phosphonium fumarate, mono (triethylmethyl)phosphonium maleate.

Examples of compounds within Formula IV are tetramethylene bis(tributyl phosphonium diacetate), tetramethylene bis(triisopropyl phosphonium diacetate), tetramethylene bis(trimethyl phosphonium diacetate), tetramethylene bis(trioctadecyl phosphonium diacetate), tetramethylene bis(triphenyl phosphonium diacetate), tetramethyl bis(trioleyl phosphonium diacetate), tetramethylene bis(tribenzyl phosphonium diacetate), tetramethylene bis(dibutyl ethyl phosphonium diacetate), tetramethylene bis(triallyl phosphonium diacetate), tetramethylene bis(trimethyl phosphonium dipropionate), tetramethylene bis(trihexyl phosphonium dibutyrate), tetramethylene bis(tridodecyl phosphonium dioctanoate), tetramethylene bis(diphenylethyl phosphonium distearate, tetramethylene bis(triethyl phosphonium dioleate, methylene bis(tributyl phosphonium diacetate), decamethylene bis(tributyl phosphonium diacetate), methylene bis(trihexadecyl phosphonium dibutyrate), tetramethylene bis(trioctyl phosphonium diacetate), trimethylene bis(trimethyl phosphonium dipropionate), hexamethylene bis(trioctadecyl phosphonium divalerate), hexamethylene bis(tribenzyl phosphonium diacetate), methylene bis(triethyl phosphonium dihexanoate), tetramethylene bis(tributyl phosphonium dibenzoate), trimethylene bis(trimethyl phosphonium diacrylate), tetramethylene bis(triethyl phosphonium dimethacrylate), methylene bis(triphenyl phosphonium diacetate) and ethylene bis(triphenyl phosphonium diisobutyrate).

The phosphonium compounds of the present invention are useful as catalysts, e.g., in curing melamine-formaldehyde resins, urea-formaldehyde resins, furfuryl alcohol resins and phenol-formaldehyde resins. They are also useful as bactericides antistatic agents, emulsifying agents, etc.

Unless otherwise indicated, all parts and percentages are by weight.

EXAMPLE 1

0.417 mole of tetrabutyl phosphonium chloride in 200 grams of acetic acid was gassed with 0.54 mole of ammonia at a temperature of 20–50° C. After stirring for two hours, 200 grams of benzene were added and the mixture filtered to remove the ammonium chloride formed. The solvents and excess ammonium acetate were removed in vacuo by heating to a final temperature of 150° C. at 1.0 mm. Hg.

The crude product obtained as a residue weighed 160 grams (theory 158 grams) and was a white solid, M.P. 64–78° C., acid value 151 (theory 148), chlorine 0.12%.

The crude tetrabutyl phosphonium diacetate was crystallized from an equal weight of butyl acetate to give 135 grams (85% yield) of pure tetrabutyl phosphonium diacetate as a white solid melting at 79–81° C., acid value 148, chlorine 0.01%.

EXAMPLE 2

The procedure of Example 1 was repeated except that instead of adding 0.54 mole of ammonia gas there was dissolved 0.54 mole of sodium acetate in the acetic acid-benzene mixture. The yield of purified tetrabutyl phosphonium diacetate obtained by crystallization from butyl acetate was 83% of theoretical and it had an M.P. of 79–81° C., chlorine 0.01% and an acid value of 148.

The tetrabutyl phosphonium diacetate is easier to prepare in the pure form than is tetrabutyl phosphonium acetate since the diacetate is a crystalline solid and the normal acetate is a liquid.

EXAMPLE 3

Tetrabutyl phosphonium dihexanoate was prepared by mixing 0.2 mole of tetrabutyl phosphonium chloride dissolved in 60.0 grams of hexanoic acid with 0.22 mole of sodium hexanoate dissolved in 200 grams of hexanoic acid. The sodium chloride formed by the reaction was removed by filtration. Hexanoic acid was removed at reduced pressure at up to 180° C. at 0.1 min. and the tetrabutyl phosphonium dihexanoate was recovered as a pale yellow liquid product in 96% yield, acid value 108 (theory 114.2), chlorine 0.2%.

EXAMPLE 4

Benzyl trioctyl phosphonium diacetate was obtained in 98% yield by reacting 0.417 mole of benzyl trioctyl phosphonium chloride in a mixture of 200 grams of acetic acid and 200 grams of benzene at 20–50° C. The mixture was filtered to remove the sodium chloride and the solvents removed in vacuo. The benzyl trioctyl phosphonium diacetate was recovered in 98% yield as a pale amber liquid, acid value 92.5 (theory 96.5), chloride 0.2%.

EXAMPLE 5

Methallyl tributyl phosphonium diacetate was prepared in the manner described in Example 1 by replacing the tetrabutyl phosphonium chloride by 0.417 mole of methallyltributyl phosphonium chloride. The diacetate prepared was recovered in 94% yield as a lemon-colored liquid, acid value 150.2 (theory 149.0), chlorine 0.16%.

EXAMPLE 6

Tetrahexyl phosphonium diacetate was prepared in the manner described in Example 2 except that there was used 0.417 mole of tetrahexyl phosphonium chloride as the starting phosphonium compound. The diacetate product was a colorless liquid, acid value 108 (theory 114.1), chlorine 0.16%.

EXAMPLE 7

Tetramethylene bis (tributyl phosphonium diacetate) was prepared by reacting 0.213 mole of tetramethylene bis (tributyl phosphonium chloride) with 0.54 mole of sodium acetate in 250 grams of acetic acid at 20–50° C. The crude product obtained after removal of the solvent was crystallized from cold 1-chlorobutane to give white crystals of tetramethylene bis (tributyl phosphonium diacetate) M.P. 44–46° C., acid value 159.1 (theory 160.8), having the formula

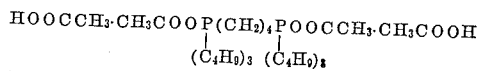

What is claimed is:
1. A compound having a formula selected from the group consisting of (a) $R_4P^+OOCR' \cdot R'COOH$; (b) $R_4P^+OOC(CH_2)_nCOOH$; (c) $R_4P^+OOCCH=CHCOOH$; and

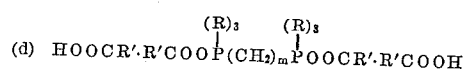

where R is a hydrocarbon group selected from the group consisting of alkyl, alkenyl, phenyl, methylphenyl, naphthyl, benzyl, dimethyl phenyl, ethylphenyl and phenyl ethyl, R' is selected from the group consisting of hydrogen alkyl up to 17 carbon atoms, phenyl, alkenyl of 2 to 17 carbon atoms, and styryl $n$ is selected from the group consisting of 0 and a positive integer up to 10 and $m$ is a positive integer of from 1 to 10.

2. $R_4POOCR' \cdot R'COOH$ where R is hydrocarbon selected from the group consisting of alkyl, alkenyl, phenyl, methylphenyl, naphthyl, benzyl, dimethyl phenyl, ethylphenyl and phenyl ethyl and R' is selected from the group consisting of hydrogen alkyl up to 17 carbon atoms, phenyl, alkenyl of 2 to 17 carbon atoms, and styryl.

3. A phosphonium compound according to claim 2 wherein R' is selected from the group consisting of alkyl, phenyl and methylphenyl.

4. Tetrahydrocarbyl phosphonium acid alkanoate wherein the hydrocarbyl groups are selected from the group consisting of alkyl, alkenyl, phenyl, methylphenyl and benzyl and the alkanoate groups each have 2 to 18 carbon atoms.

5. Tetrahydrocarbyl phosphonium acid acetate wherein the hydrocarbyl groups are selected from the group consisting of alkyl, alkenyl, phenyl, methylphenyl and benzyl.

6. Tetraalkyl phosphonium acid acetate.

7. Tetraalkyl phosphonium acid alkanoate wherein each alkanoate group has 2 to 6 carbon atoms.

8. Trialkyl benzyl phosphonium acid alkanoate wherein each alkanoate group has 2 to 6 carbon atoms.

9. Trialkyl alkenyl phosphonium acid alkanoate wherein each alkanoate group has 2 to 6 carbon atoms.

10.

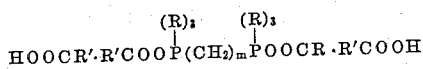

where R is a hydrocarbon group selected from the group consisting of alkyl, alkenyl, phenyl, methylphenyl, naphthyl, benzyl, dimethyl phenyl, ethylphenyl and phenyl ethyl, R' is selected from the group consisting of hydrogen alkyl up to 17 carbon atoms, phenyl, alkenyl of 2 to 17 carbon atoms, and styryl, and $m$ is a positive integer of 1 to 10.

11. A compound according to claim 10 where R' is selected from the group consisting of alkyl, phenyl and methylphenyl and R is selected from the group consisting of alkyl, phenyl, methylphenyl, benzyl and alkenyl.

12. A compound according to claim 11 where R' is methyl.

13. Polymethylene bis(trialkylphosphonium acid alkanoate) wherein each alkanoate group has 2 to 6 carbon atoms and the polymethylene group has 2 to 10 carbon atoms.

14. Methylene bis(trialkylphosphonium acid alkanoate) wherein each alkanoate group has 2 to 6 carbon atoms.

15. Tetramethylene bis(trialkylphosphonium acid acetate).

16. A process of preparing a compound of claim 1 comprising:
reacting a tetrahydrocarbon phosphonium halide having the formula $R_4P$ halide with a mixture of at least one mole of a member of the group consisting of alkali metal and ammonium salts of a carboxylic acid having the formula R'COOH together with at least one mole of the free acid R'COOH where the compound of claim 1 is compound (a).

17. A process of preparing a phosphonium acid alkanoate comprising reacting one mole of a tetrahydrocarbonphosphonium halide with a mixture of at least one mole of a member of the group consisting of alkali metal and ammonium salts of an alkanoic acid having 2 to 6 carbon atoms together with at least one mole of the free alkanoic acid, said hydrocarbon groups being selected from the group consisting of alkyl, phenyl, methylphenyl, dimethyl phenyl, ethylphenyl, alkenyl, benzyl and phenyl ethyl, said halide halogen being selected from the group consisting of chlorine, bromine and iodine.

18. A process of preparing an alkylene bis(trihydrocarbylphosphonium acid alkanoate) comprising reacting one mole of an alkylene bis (trihydrocarbylphosphonium halide) with a mixture of at least two moles of a member of the group consisting of alkali metal and ammonium salts of an alkanoic acid having 2 to 6 carbon atoms together with at least two moles of the free alkonoic acid, said hydrocarbyl groups being selected from the group consisting of alkyl, phenyl, methylphenyl, dimethyl phenyl, ethylphenyl, alkenyl, benzyl and phenyl ethyl, said halide halogen being selected from the group consisting of chlorine, bromine and iodine.

19. A process of preparing a compound of claim 1 comprising reacting a mixture of at least two moles of a member of the group consisting of ammonium and alkali metal salts of a carboxylic acid having the formula R'COOH together with at least 2 moles of the free acid R'COOH and one mole of alkylene bis(phosphonium halide) where the compound of claim 1 is compound (d).

References Cited

UNITED STATES PATENTS 2,102,103  12/1937  Urgain et al. _____ 260—541
2,310,208  2/1943   Bley _____ 18—54

OTHER REFERENCES

J. of Organic Chem., vol. 28, 1963, p. 1133.

RICHARD K. JACKSON, Primary Examiner.

VIVIAN GARNER, Examiner.